UNITED STATES PATENT OFFICE 2,417,897

3,3 BIS(4 DIMETHYLAMINOPHENYL)6-DIMETHYLAMINOPHENYL PHTHALIDE

Clyde S. Adams, Yellow Springs, Ohio, assignor to The National Cash Register Company, Dayton, Ohio, a corporation of Maryland No Drawing. Application June 16, 1945, Serial No. 599,967

1 Claim. (Cl. 260—344.6)

This invention relates to the new compound 3,3 bis(4 dimethylaminophenyl) 6 - dimethylaminophenyl phthalide, having the structure

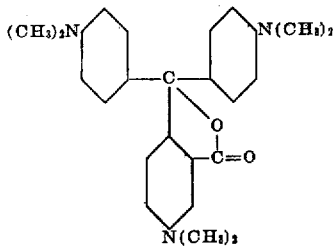

and which, for purposes of convenience, will be referred to herein as the lactone of crystal violet or as crystal violet lactone.

The novel compound has a melting point of approximately 169 degrees centigrade and crystallizes from ethyl alcohol in long needle-shaped white crystals.

The compound has the unique characteristic of being colorless, or nearly so, under normal conditions, but changes to an intense blue upon being placed in adsorption contact with highly polar substances such as clay, silicon dioxide, and magnesium carbonate, or when in contact with weak acids. It has, among other utilities, unique value as an ingredient of paper-coating compounds which include clay or other dry solid polar fillers. Such coatings, when suitably made, as described in the co-pending application of Barrett K. Green for United States Letters Patent, Serial No. 581,834, filed March 5, 1945, respond to marking pressures by producing a color. This novel compound, crystal violet lactone, produces a strong color in such coatings and is highly stable against environmental action in both the polarized and the unpolarized states.

Other uses for the novel substance will parallel uses for other known triphenyl methane lactones.

Crystal violet lactone may be prepared by condensing Michler's hydrol, having the structure

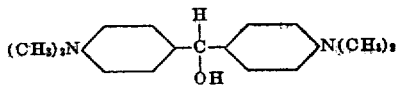

with m-dimethylaminobenzoic acid, having the structure

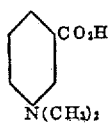

to produce an intermediate compound, 2(4,4'bis dimethylaminobenzohydryl) 5 - dimethylaminobenzoic acid, which is subsequently oxidized to crystal violet lactone.

Michler's hydrol may be obtained commercially, as it is an important intermediate in the dyestuff industry, but m-dimethylaminobenzoic acid is not obtainable even for laboratory use, so a method of its preparation will be given.

Preparation of m-dimethylaminobenzoic acid

The m-dimethylaminobenzoic acid may be made by the methylization of m-aminobenzoic acid, having the structure

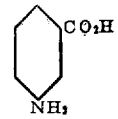

using methyl iodide in the presence of an aqueous solution of potassium hydroxide. The m-aminobenzoic acid is obtainable commercially, but at present only in small amounts. It is, however, a well-known compound. The first step in the preparation of m-dimethylaminobenzoic acid is to produce its betain. Seventy grams of m-aminobenzoic acid is dissolved in 700 milliliters of 50% methyl alcohol, using a two-liter flask fitted with a cork. The resulting mixture may be warmed to effect complete solution. To the solution, when cooled, is added 225 grams of methyl iodide, followed by the addition of 105 grams of 85% potassium hydroxide, which is the approximate strength of the ordinary commercial C. P. product, in three separate charges of 35 grams each, each 35-gram charge being previously dissolved in 100 cc. of 50% methyl alcohol. The first charge is introduced into the flask, which is stoppered and permitted to stand at room temperature until a test shows that the solution is acid. The second and third charges are added successively, the timing of the third charge, as in the case of the second charge, awaiting the event of the acid condition of the solution. The solution is allowed to stand until the disappearance of the methyl iodide which forms a separate layer at the bottom of the flask. This period of methylation usually requires from three to five days.

The contents of the flask are now subjected to distillation until most of the methyl alcohol has been distilled over. The remaining aqueous solution is cooled, and 75 milliliters of concentrated hydrochloric acid (37% gas content by weight) is added. On standing and cooling, white crystals of the hydrated hydriodic acid salt of m-trimethylbenzbetain separate out. These crystals are filtered off and air dried.

The betain, which has the structure

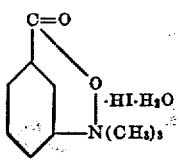

is next converted to the methyl ester of m-dimethylaminobenzoic acid in the following manner. Enough of the betain prepared in accordance with the preceding step to make 100 grams is placed in a wide-mouthed Erlenmeyer flask immersed in an oil bath. The temperature is gradually raised to a point at which the betain begins to melt and decompose, giving off gaseous hydrogen iodide and water vapor. The temperature slowly climbs to a point at which the decomposition is completed. The decomposition should be carried on slowly and carefully to prevent loss of product by entrainment. A light oil, which is essentially the free betain, remains in the flask. The temperature of the oil is then raised to 235 degrees centigrade for approximately fifteen minutes, during which the transition of the betain to the corresponding ester takes place. The ester, having the formula

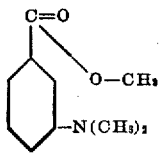

is then cooled and solidifies to a wax-like solid.

The ester prepared in the preceding step is then saponified in the following manner. Sixty-four grams of the waxy methyl ester of m-dimethylaminobenzoic acid is dissolved in a solution made of 100 milliliters of concentrated hydrochloric acid and 100 milliliters of water. The resulting solution is boiled for five minutes to saponify the ester. The hot acid solution of m-dimethylaminobenzoic acid should be treated with activated charcoal and boiled for a few minutes longer to decolorize it. The resulting mixture is filtered hot. The residual activated charcoal is washed with a small quantity of hot water while still on the filter, and the washings are added to the main filtrate.

Next, m-dimethylaminobenzoic acid is isolated from the resulting acid solution. The acid solution of m-dimethylaminobenzoic acid is cooled and partially neutralized with a cold saturated solution of sodium hydroxide. Final neutralization is accomplished by adding sodium carbonate solution as long as the precipitate, which first forms, redissolves on stirring. The resulting solution is then treated with a saturated solution of sodium acetate prepared by dissolving 60 grams of hydrated sodium acetate in 50 milliliters of water. The resulting mixture is allowed to cool, and the resulting crystals of m-dimethylaminobenzoic acid are filtered off, washed with a small quantity of cold water, and air dried. This crude air-dried product may be further purified by recrystallizing it from its solution in hot benzene.

*Condensation of Michler's hydrol with m-dimethylaminobenzoic acid*

The "leuco-carboxy" compound 2(4,4'bis di- methylaminobenzohydryl) 5 - dimethylaminobenzoic acid, having the structure

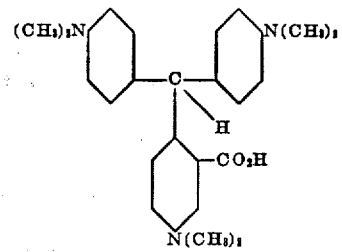

is prepared by condensing Michler's hydrol with m-dimethylaminobenzoic acid, said condensation being represented as follows:

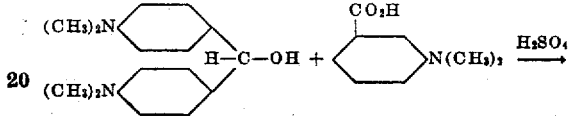

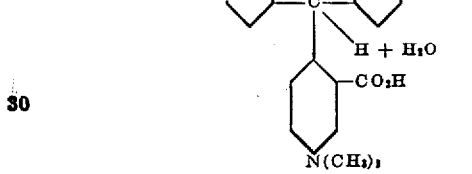

As an example, 18 grams of m-dimethylaminobenzoic acid crystals is mixed and powdered with 27 grams of Michler's hydrol. The resulting intimate mixture is then added very slowly to 212 grams of 90% sulphuric acid which has been previously cooled to zero degrees centigrade by an ice bath. The sulphuric acid is mechanically stirred during the addition of the mixture. After addition of the mixture, the resulting solution is allowed to stand at room temperature for several hours. The brown acid solution is then poured slowly onto 1,000 grams of ice. The resulting dilute acid solution is then partially neutralized, while being stirred, with a strong sodium hydroxide solution, followed by more precise neutralization accomplished by adding sodium carbonate solution as long as the precipitate, which first forms, redissolves on stirring. Two hundred grams of solid hydrated sodium acetate is then added, the solution being constantly stirred. The resulting mixture is permitted to stand several hours in a cool place. The cooled mixture is filtered to recover the solid condensation products, which are washed on the filter with water and thereafter redissolved in a minimum quantity of dilute hydrochloric acid.

The resulting dilute hydrochloric acid solution of the condensation products is neutralized with a sodium hydroxide solution, excess being added to make the solution definitely alkaline. The alkaline solution should be boiled for a few minutes, cooled, and filtered. The alkaline filtrate containing the sodium salt of 2(4,4'bis dimethylaminobenzohydryl) 5-dimethylaminobenzoic acid is acidified with acetic acid, care being taken not to add much excess acetic acid after the solution becomes acid. The free "leuco-carboxy" compound—namely, 2(4,4'bis dimethylaminobenzohydryl) 5-dimethylaminobenzoic acid — crystallizes out from the acid solution on cooling and standing. This "leuco-carboxy" compound is filtered off and dried in a desiccator over a drying substance such as Drierite. The dried "leuco-carboxy" compound is re-crystallized from a hot benzene solution. The resulting gray crystals of 2(4,4'bis dimethylaminophenyl) 5 - dimethylaminobenzoic acid, having a melting point of 199-200 degrees centigrade, are filtered off, washed with petroleum ether, and air dried.

*Oxidation of the "leuco-carboxy" compound 2(4,4'bis dimethylaminobenzohydryl) 5 - di - methylaminobenzoic acid*

One hundred and twelve grams of the dry "leuco-carboxy" compound is dissolved in 10.7 liters of N/10 hydrochloric acid, and one liter of water is added. Heat may be necessary to complete the solution.

The resulting solution is cooled to zero degrees centigrade by means of an ice-salt bath, and 72 grams of 90% lead dioxide is added slowly, with stirring, in the form of a thin paste. The resulting mixture should be stirred for fifteen minutes to complete the oxidation. Forty-two grams of anhydrous sodium sulphate dissolved in one liter of water is then added to the oxidation mixture to precipitate the lead as sulphate. The resulting mixture is then treated with sufficient hydrochloric acid to just dissolve the crystal violet lactone, which tends to precipitate out in the dilute hydrochloric acid during oxidation. The mixture is filtered to remove the lead sulphate, and the filtrate is neutralized with sodium hydroxide solution, making the solution distinctly alkaline. The crystal violet lactone which precipitates out from the alkaline solution is filtered off, washed with a small quantity of cold water, and redissolved in hot 95% ethyl alcohol. If the alcohol solution of the crystal violet lactone is colored due to the presence of some colored isomers or other impurities, it should be treated while still hot with activated charcoal and the hot alcohol solution filtered. On permitting the colorless hot alcohol filtrate of crystal violet lactone to cool and stand at room temperature, long needle-shaped white crystals of the lactone crystallize out. The crystals of this novel compound are filtered off, washed with a small quantity of cold dilute ethyl alcohol, and dried.

What is claimed is:

The compound 3,3 bis(4 dimethylaminophenyl)-6 dimethylaminophenyl phthalide having the structure

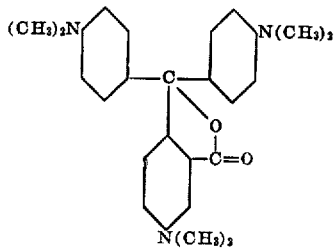

CLYDE S. ADAMS.

REFERENCES CITED

The following references are of record in the file of this patent:

UNITED STATES PATENTS

| Number | Name | Date |
| --- | --- | --- |
| 2,130,480 | Austin | Sept. 20, 1938 |

OTHER REFERENCES

Chemical Abstracts, 32, 1938, page 2106, citing Schwarzenbach, et al.

Helv. Chem. Acta, 20, (1937), pages 1591-1600, Rec. Trav. Chim., volume 46, pages 653-98 (*page 657) (1927). (Scientific Library.)